(12) United States Patent
Himanshu

(10) Patent No.: US 10,560,369 B2
(45) Date of Patent: Feb. 11, 2020

(54) METHODS AND SYSTEMS FOR DETECTING AND TRANSFERRING DEFECT INFORMATION DURING MANUFACTURING PROCESSES

(71) Applicant: Wipro Limited, Bangalore (IN)

(72) Inventor: Himanshu, Sitamarhi (IN)

(73) Assignee: Wipro Limited, Bangalore (IN)

( * ) Notice: Subject to any disclaimer, the term of this patent is extended or adjusted under 35 U.S.C. 154(b) by 293 days.

(21) Appl. No.: 15/244,052

(22) Filed: Aug. 23, 2016

(65) Prior Publication Data
US 2017/0373965 A1   Dec. 28, 2017

(30) Foreign Application Priority Data

Jun. 23, 2016   (IN) .............................. 201641021647

(51) Int. Cl.
  *G06F 15/16*   (2006.01)
  *H04L 12/707*   (2013.01)
  (Continued)

(52) U.S. Cl.
  CPC ............ *H04L 45/22* (2013.01); *H04L 45/125* (2013.01); *H04L 47/38* (2013.01); *H04L 67/12* (2013.01); *H04L 69/18* (2013.01)

(58) Field of Classification Search
  CPC ...................................................... H04L 45/22
  See application file for complete search history.

(56) References Cited

U.S. PATENT DOCUMENTS 6,175,832 B1 *  1/2001  Luzzi ....................... H04L 63/12
7,668,953 B1 *  2/2010  Sinclair ................. H04L 41/064
                                                          709/224
(Continued)

FOREIGN PATENT DOCUMENTS

CN       102621147     8/2012
WO   WO 2014/017714   1/2014

OTHER PUBLICATIONS

Nirbhar Neogi, et al., "Review of vision-based steel surface inspection systems", *EURASIP Journal on Image and Video Processing 2014*, 2014.50, 19 pages.
(Continued)

*Primary Examiner* — Kevin T Bates
*Assistant Examiner* — Clarence D McCray
(74) *Attorney, Agent, or Firm* — Finnegan, Henderson, Farabow, Garrett & Dunner, LLP

(57) ABSTRACT

A method, corresponding system, and computer program product for detecting and transferring defect information during a manufacturing process is disclosed. The method includes receiving data to be transferred from a source to a destination over a primary communication link. The method identifies at least one type of data in the received data in response to receiving the data to be transferred over the primary communication link. Thereafter, the method allows transfer of a first type of data from the at least one type of data to the destination over a secondary communication link, the first type of data corresponding to the defect information, and wherein the secondary communication link is different from the primary communication link. Further, the method allows transfer of a second type of data from the at least one type of data to the destination over the primary communication link.

18 Claims, 10 Drawing Sheets

(51) Int. Cl.
  *H04L 12/729* (2013.01)
  *H04L 12/811* (2013.01)
  *H04L 29/08* (2006.01)
  *H04L 29/06* (2006.01)

(56) References Cited

U.S. PATENT DOCUMENTS

| | | |
|---|---|---|
| 9,141,345 B2 | 9/2015 | Armour et al. |
| 2002/0154308 A1* | 10/2002 | Uesugi .................. B21C 51/005 356/431 |
| 2004/0120571 A1* | 6/2004 | Duvdevani ........ G06K 9/00973 382/149 |
| 2007/0008978 A1* | 1/2007 | Pirzada ................. H04L 45/306 370/395.43 |
| 2007/0067134 A1* | 3/2007 | Borowicz ........ G05B 19/41875 702/127 |
| 2007/0185916 A1* | 8/2007 | Prahlad ................. G06F 3/0605 |
| 2007/0291766 A1 | 12/2007 | Knazik et al. |
| 2008/0008116 A1* | 1/2008 | Buga ..................... H04L 41/046 370/328 |
| 2010/0241365 A1* | 9/2010 | Goto ........................ G01N 3/08 702/33 |
| 2012/0163224 A1* | 6/2012 | Long ................... H04L 41/5025 370/252 |
| 2013/0286814 A1* | 10/2013 | Lee ....................... H04W 40/34 370/216 |
| 2014/0056126 A1* | 2/2014 | Bencheck .............. H04L 69/40 370/228 |
| 2014/0122729 A1* | 5/2014 | Hon ........................ H04L 67/04 709/228 |
| 2014/0192818 A1 | 7/2014 | Huang et al. |
| 2016/0149996 A1* | 5/2016 | Eckert .................... H04L 43/06 709/217 |

OTHER PUBLICATIONS

European Search Report dated Feb. 7, 2017 in counterpart European Patent Application No. 16191849.5, 8 pages.
Anonymous: "Traffic shaping—Wikipedia", Jun. 14, 2016, https://en.wikipedia.org/w/index.php?title=Traffic_shaping&oldid=725195597, pp. 1-6.
European Search Report issued in the European Patent Office in counterpart European Application No. 16191849.5 dated Oct. 30, 2019. 9 pages.

* cited by examiner

METHODS AND SYSTEMS FOR DETECTING AND TRANSFERRING DEFECT INFORMATION DURING MANUFACTURING PROCESSES

TECHNICAL FIELD

The present invention relates generally to detecting defects during manufacturing process, in particular, to methods and systems for detecting and transferring defect information during manufacturing processes.

BACKGROUND

In a manufacturing environment, such as in a steel industry, the usage of material is dependent upon quality parameters, for example, surface quality. However, traditional methods for manual surface inspection of materials are inadequate and do not guarantee a defect free surface, thereby affecting the quality of the material. Early detection of surface defects can help in reducing the damage to the material as well as bring down the overall cost of manufacturing the material. However, the complex level of application and volume of surface defect data maintained at each level in the manufacturing environment leads to huge operational cost and loss of valuable revenue.

Further, the surface defect data as well as production data are transferred through the same communication channel to the Information Technology (IT) system associated with the manufacturing environment. This leads to increased difficulty in identifying the surface defect data from the production data and increased delay in run-time decision making regarding the manufacturing process. Moreover, transfer of the surface defect data and the production data over the same communication channel also causes tight coupling of the production data with the surface defect data and thereby leads to complexity in maintenance of the data.

Technological advances that allow for appropriate separation of the surface defect data from the production data, faster transfer of the surface defect data to the IT system associated with the manufacturing process, and efficient storage of the surface defect data and the production data for enabling faster run-time decision making are desirable.

SUMMARY

In one embodiment, a method for transferring defect information during a manufacturing process is disclosed. The method includes receiving, by a defect detecting device, data to be transferred from a source to a destination over a primary communication link, wherein the primary communication link connects the source to the destination; identifying, by the defect detecting device, at least one type of data in the received data; allowing, by the defect detecting device, transfer of a first type of data from the at least one type of data to the destination over a secondary communication link, the first type of data corresponding to the defect information, wherein the secondary communication link has faster data transfer rate than the primary communication link, and wherein the secondary communication link connects the source to the destination; and allowing, by the defect detecting device, transfer of a second type of data from the at least one type of data to the destination over the primary communication link.

In another embodiment, a defect detecting device configured to transmit defect information during a manufacturing process is disclosed. The defect detecting device includes a memory; and a controller operatively coupled to the memory, wherein the controller is configured to: receive data to be transferred from a source to a destination over a primary communication link, wherein the primary communication link connects the source to the destination; identify at least one type of data in the received data; allow transfer of a first type of data from the at least one type of data to the destination over a secondary communication link, the first type of data corresponding to the defect information, wherein the secondary communication link has faster data transfer rate than the primary communication link, and wherein the secondary communication link connects the source to the destination; and allow transfer of a second type of data from the at least one type of data to the destination over the primary communication link.

In yet another embodiment, a computer-usable medium is disclosed, the computer-usable medium having non-transitory computer readable instructions stored thereon for execution by a controller in a defect detecting device to perform a method for receiving data to be transferred from a source to a destination over a primary communication link, wherein the primary communication link connects the source to the destination; identifying at least one type of data in the received data; allowing transfer of a first type of data from the at least one type of data to the destination over a secondary communication link, the first type of data corresponding to the defect information, wherein the secondary communication link has faster data transfer rate than the primary communication link, and wherein the secondary communication link connects the source to the destination; and allowing transfer of a second type of data from the at least one type of data to the destination over the primary communication link.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for detecting and transferring defect information in a manufacturing process environment. Specifically, the method detects and transfers surface defect data in a manufacturing process environment. The method includes receiving data to be transferred from a source to a destination over a primary communication link. The method identifies at least one type of data in the received data in response to receiving the data. Thereafter, the method allows transfer of a first type of data from the at least one type of data to the destination over a secondary communication link. The secondary communication link is different from the primary communication link. Further, the method allows transfer of a second type of data from the at least one type of data to the destination over the primary communication link.

Figure 1:
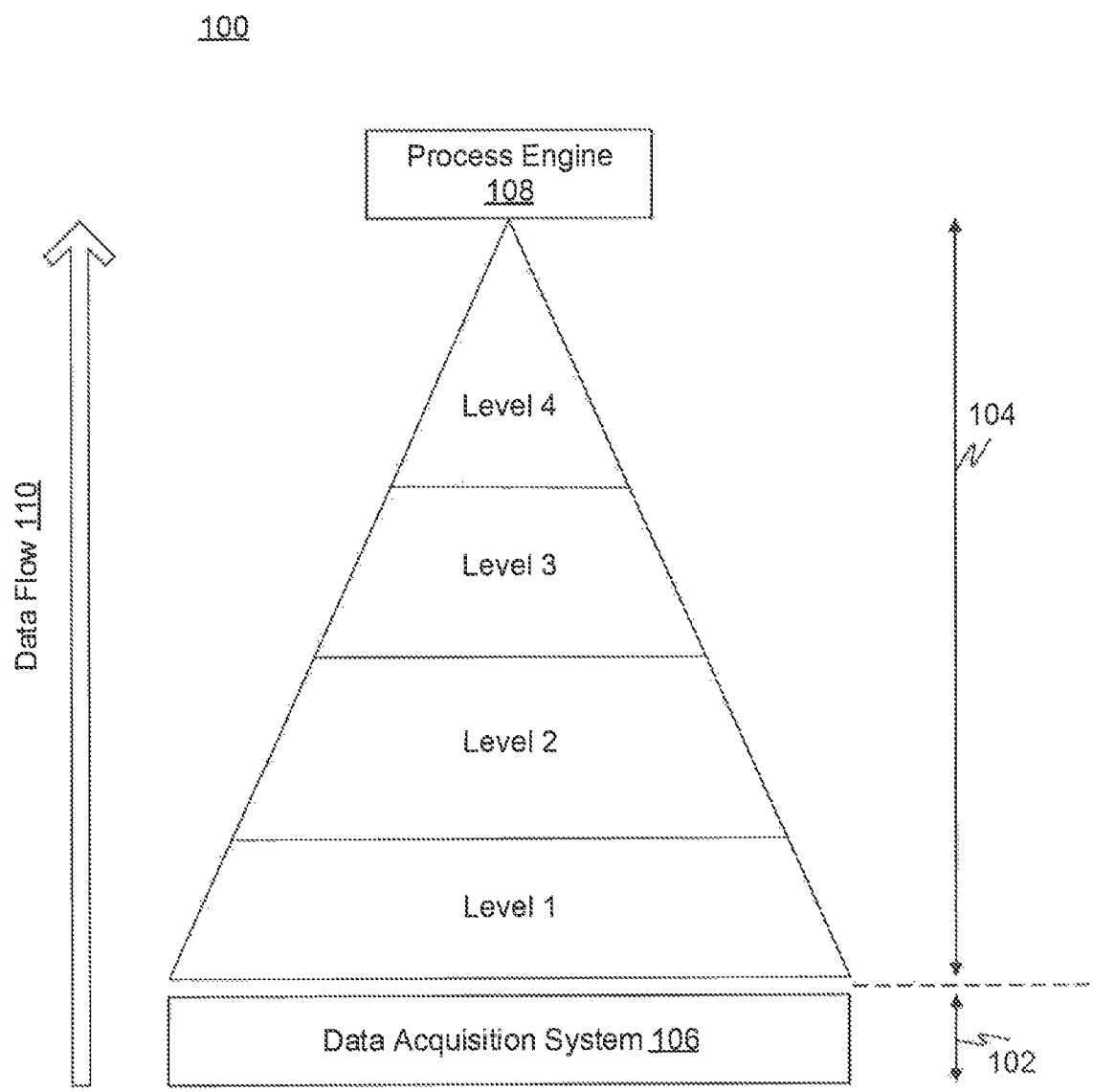
FIG. 1 is a system diagram of a manufacturing process environment (that is exemplary) in which embodiments of the present inventive concepts may be employed.

FIG. 1 is a system diagram of a manufacturing process environment 100 in which embodiments of the present inventive concepts may be employed. Manufacturing process environment 100 may include a production floor system 102 and an IT system 104 associated with it. Production floor system 102 includes various machines, components, and devices (not shown in FIG. 1) required for producing various materials such as steel, iron, aluminum, and copper. Data produced by the various machines, components, and devices in production floor system 102 is acquired by a data acquisition system 106 and sent to IT system 104 for storing, processing and analyzing the acquired data. The acquired data may include production data associated with the manufacturing process, surface defect data associated with the material that is getting manufactured, machine data associated with the manufacturing process, sensor data associated with the manufacturing process, and diagnostic data associated with the manufacturing process. It will be evident to a person skilled in the art that there may be other types of data that can be acquired from manufacturing process environment 102 and sent to IT system 104.

The acquired data may be stored, processed and analyzed at multiple levels in manufacturing process environment 100 as shown in FIG. 1. For example, the acquired data is sent from data acquisition system 106 to a processing engine 108 via level 1, level 2, level 3 and level 4 in a serial manner as represented in FIG. 1. The acquired data may be stored at any one of level 1, level 2, level 3, and level 4. Alternatively, the acquired data may be stored at all the levels for facilitating processing and analysis of the acquired data. The flow of the acquired data in manufacturing process environment is represented by dataflow arrow 110 as shown in FIG. 1. In other words, the acquired data flows from lower level, i.e., level 1 to the next level, i.e., level 2 and then level 3 and finally level 4. The architecture of manufacturing process environment 100 as shown in FIG. 1 is for representative purposes only and a person of ordinary skill in the art will appreciate that several other architectures may be realized for manufacturing process environment 100. Thus, architecture of manufacturing process environment 100 as shown in FIG. 1 should not be construed to be limiting in scope.

Figure 2:
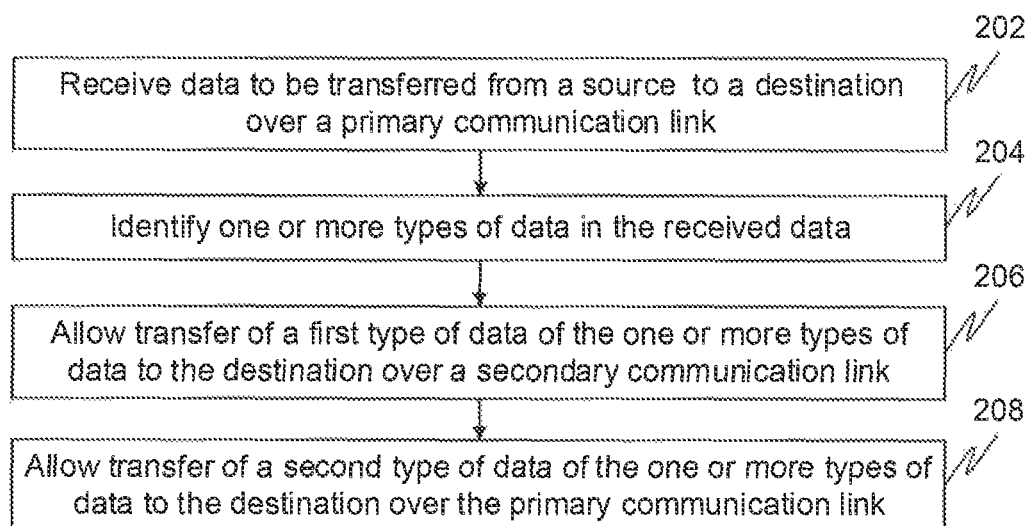
FIG. 2 illustrates a flowchart of a method for transferring defect information during a manufacturing process, in accordance with an embodiment.

FIG. 2 illustrates a flowchart of a method for transferring defect information during a manufacturing process, in accordance with an embodiment. As explained in conjunction with FIG. 1, data is produced by various machines, components, and devices in a manufacturing process environment 100. In order to store, process, and analyze the data, the data needs to be sent from source, where data is generated, to destination, where data is analyzed for one or more purposes. The data may be analyzed for, but not limited to monitoring, controlling, diagnostics, prognostics, predictive analytics, and various other similar services and solutions.

Thus, at step 202, the data is received to be transferred from a source to a destination over a primary communication link. The primary communication link connects the source to the destination. Thereafter, at step 204, one or more types of data are identified in the received data. The one or more types of data may include, but are not limited to production data associated with a material that is getting manufactured, surface defect data associated with the material, machine data associated with the manufacturing process, sensor data associated with the manufacturing process, and diagnostic data associated with the manufacturing process.

After identifying the one or more types of data, a first type of data of the one or more types of data is allowed, at step 206, to be transferred to the destination over a secondary communication link. The first type of data may be surface defect data associated with the material. For example, the first type of data may be surface defect data associated with steel in a steel production environment.

The secondary communication link is different from the primary communication link. Specifically, the secondary communication link includes optimized routes for transferring the first type of data from the source to the destination in a manner that is faster than the primary communication link. Moreover, the secondary communication link is specifically adapted for carrying the first type of data. For example, in the steel production environment, the secondary communication link is specifically adapted to carry the surface defect data associated with steel that is getting manufactured. In the same manner, the secondary communication link may be adapted to carry alarm data, alert data and other forms of defect information associated with the production of the material in manufacturing process environment 100.

After allowing transfer of the first type of data to the destination over the secondary communication link, a second type of data is allowed to be transferred, at step 208, to the destination over the primary communication link. The second type of data may include the production data associated with the material, machine data associated with the manufacturing process, sensor data associated with the manufacturing process, and diagnostic data associated with the manufacturing process. In an embodiment, the transfer of the first type of data to the destination over the secondary communication link and the transfer of the second type of data to the destination over the primary communication link may occur simultaneously. Alternatively, in another embodiment, the transfer of the first type of data over the secondary communication link and the transfer of the second type of data over the primary communication link may occur independently of each other. In yet another embodiment, the order of transfer of the first type of data and the transfer of the second type of data to the destination may be determined dynamically.

Figure 3:
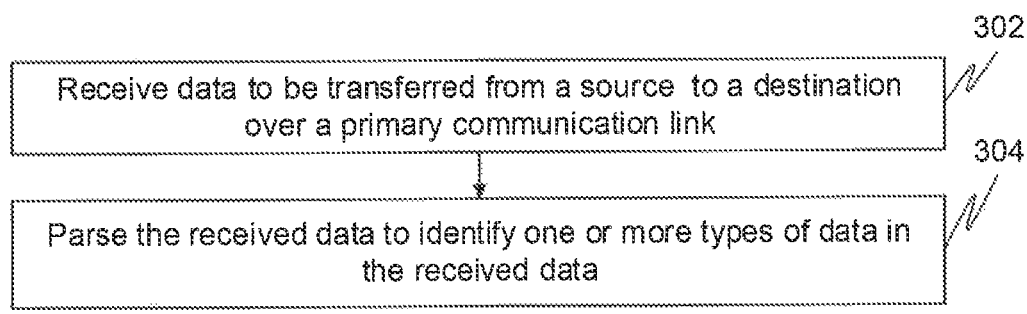
FIG. 3 illustrates a flowchart of a method for identifying one or more types of data, in accordance with an embodiment.

FIG. 3 illustrates a flowchart of a method for identifying one or more types of data, in accordance with an embodiment. At step 302, data is received from the source to be transferred to the destination over the primary communication link. After receiving the data to be transferred, the received data is parsed, at step 304, to identify the one or more data types in the received data. The data is parsed in order to separate the first type of data from the second type of data. For examples, the data is parsed to separate the surface defect data associated with steel from the production data associated with the steel manufacturing process and the steel manufacturing environment. The data is separated to facilitate processing of the first type of data in a manner that is different from processing of the second type of data. The data may also be separated to handle the first type of data in a manner that is different from the handling of the second type of data in manufacturing process environment 100.

The received data may be parsed and the surface defect data may be identified using generally available defect identification algorithm. For example, an image sensing algorithm may be used to detect surface defects associated with steel. In a typical image sensing algorithm, the pixel resolution data is captured and maintained as a benchmark for the mathematical calculations. The image sensing algorithm may be programmed to reduce the load of the dataflow by discarding the "Not OK" case data and accepting only the "OK" case data. The "OK" case data is that data where surface defect has been identified and the "Not OK" case data is that data where surface defect data was not identified. As the image sensing algorithm accepts only the OK data, the load is decreased at the root cause itself and does not travel across all levels in manufacturing process environment 100.

In an illustrative example, assume that 300 coils are getting processed in a steel manufacturing industry, out of which only 10% of the coils are identified as having surface defect data. The image sensing algorithm will send surface defect data corresponding to 30 coils of the 300 coils from level 0 in the steel manufacturing industry to the next level, i.e., level 1 and from there to level 2, then level 3 and finally level 4 in order to reduce the load of the dataflow. The image sensing algorithm will discard the data for the remaining 90% coils that is the non-defect surface data. Moreover, in a scenario, the transfer of the surface defect data can be skipped for certain levels to further fasten the dataflow and reduce the load. Thus, the surface defect data can be sent from level 0 to level 3 directly and from there to level 4, and avoiding level 1 and level 2 in the process.

In addition to reducing the load of the dataflow, the image sensing algorithm may also be programmed to combine all available surface defect identification technologies available in order to obtain a qualitative and accurate product. For example, to get an accurate identification of a defect present in a steel manufacturing process, an Intensity Image (I) may be created. The intensity image (I) is a data matrix whose values represent intensities within some range. An intensity image (I) is represented as a single matrix, wherein each element of the matrix corresponding to one image pixel is added for the valuation of each pixel as shown in equation (i) given below:

$$I(i,j)=P1(i,j)-P2(i,j) \quad (i)$$

In addition to intensity image (I), an RGB matrix (RGB (TrueColor) Images®) for the steel may also be created as shown in equation (ii) given below. The color of each pixel is determined by the combination of the red, green, and blue intensities stored in each color plane at the pixel's location.

$$R(i,j)=P1(i,j)-P2(i,j) \quad (ii)$$

After creating the intensity image matrix and the RGB matrix, the two techniques and their results are put to analysis for accuracy, wherein above two matrix plot (Intense and RGB) is again compared with the baseline matrix plot of a NO defect surface associated with the steel that is getting manufactured. Thereafter, the defect is finally classified as shown in equation (iii) given below. Any deviation in positive will signify that the surface area is having defect.

$$\text{Deviation}=\Sigma[QP1,IP1,RP1]-E[QP2,IP2,RP2] \quad (III)$$

It will be evident to a person skilled in the art that any other techniques may be used to identify the surface defect data of the material. The technique may be chosen based on type of the material, computing capabilities available in manufacturing process environment 100, level of accuracy desired, and types of data associated with manufacturing process environment 100.

Figure 4:
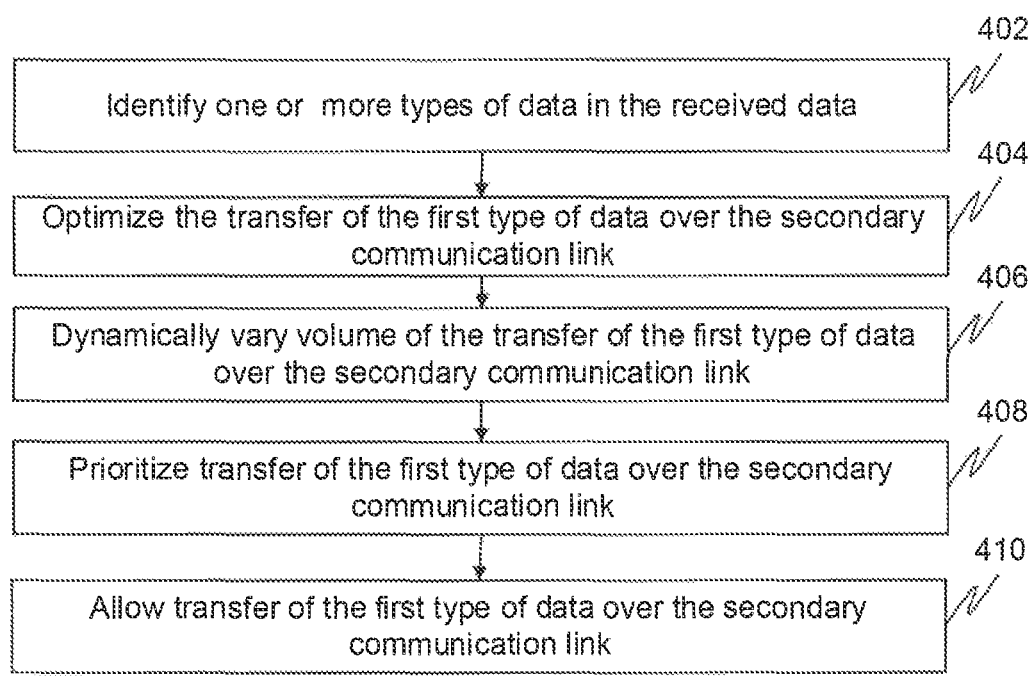
FIG. 4 illustrates a flowchart of a method for allowing transfer of a first type of data, in accordance with an embodiment.

FIG. 4 is a flowchart of a method for allowing transfer of a first type of data, in accordance with an embodiment of the invention. After receiving the data to be transferred to the destination, the one or more types of data are identified at step 402, in the received data. Thereafter, the first type of data is allowed to be transferred to the destination over the secondary communication link. Before allowing this transfer, the method, at step 404, may optimize the transfer of the first type of data over the secondary communication link. In order to optimize, the method may determine an appropriate cycle time for transferring the data. In the same manner, the method may optimize the transfer by modifying one or more of the bandwidth, frequency, amplitude, and duration associated with the transfer of the first type of data to the destination over the secondary communication link.

Alternatively, the method, at step 406, may dynamically vary volume of the transfer of the first type of data over the secondary communication link before allowing for the transfer of the first type of data to the destination. The volume of the first type of data to be transferred may be dynamically varied based on one or more conditions. Examples of the one or more conditions may include, but are not limited to a bandwidth utilization, a communication link strength, and a data throughput associated with the secondary communication link.

In the same manner, the method, at step 408, may prioritize transfer of the first type of data over the secondary communication link before allowing for its transfer to the destination. The transfer of first type of data to the destination may be prioritized based on one or more factors. Examples of the one or more factors may include, but are not limited to a severity level associated with the first type of data, a type of analytics application running in IT system 104, size of the data, life of the data, and category of the data associated with the first type of data. It will be evident to a person skilled in the art that any other type of processing may be performed on the first type of data before allowing for the transfer of the first type of data to the destination over the secondary communication link in order to achieve higher efficiency, quality and reliability. Finally, at step 410, the method allows for transfer of the first type of data over the secondary communication link.

Figure 5:
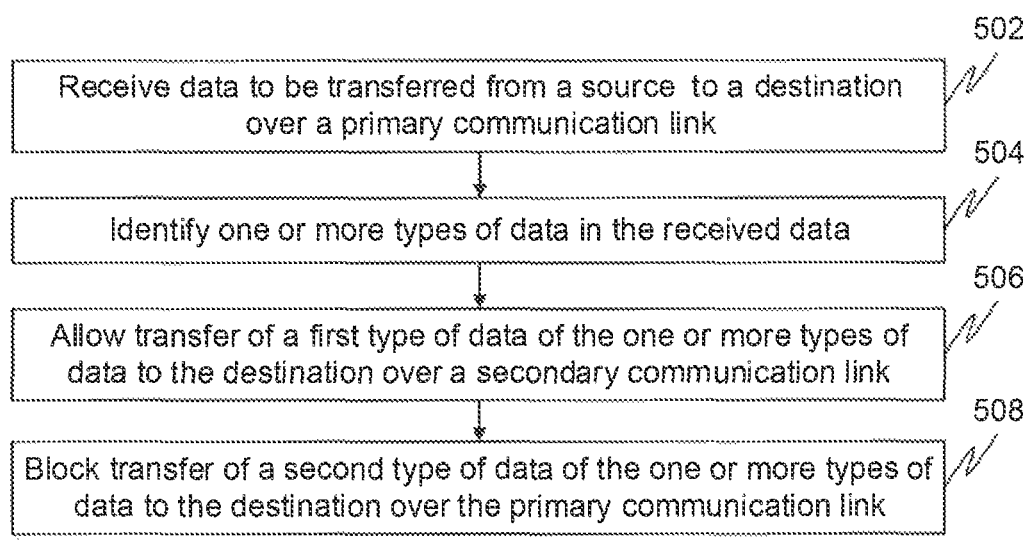
FIG. 5 illustrates a flowchart of a method for blocking transfer of a second type of data, in accordance with an embodiment.

FIG. 5 illustrates a flowchart of a method for blocking transfer of the second type of data, in accordance with an embodiment. At step 502, data to be transferred to the destination is received and thereafter at step 504, the one or more types of data are identified in the received data. The first type of data of the one or more types of data is then allowed at step 506, to be transferred to the destination over the secondary communication link.

Now, at step 508, the transfer of the second type of data to destination over the primary communication link may be blocked. The transfer of the second type of data may be blocked based on fulfillment of one or more criteria. The one or more criteria may include, but are not limited to a predefined criterion, a user defined criterion, and a real-time criterion. For example, the real-time criterion may include an existing condition associated with the primary communication link. The pre-defined criterion may include a prioritization level associated with the first type of data, and a severity level associated with the first type of data. The user defined criterion may include a type of analytics application running in IT system 104.

Thus, if the severity level of the first type of data is high and requires an immediate transfer of the first type of data to the destination, then the first type of data may be allowed to be transferred on the primary communication link in addition to the secondary communication link. During this period, the transfer of the second type of data over the primary communication link may be blocked. In the same manner, if the analytics application running in IT system 104 requires greater availability of the first type of data, then the first type of data may be transferred on the primary communication link in addition to the secondary communication link. During this period, the transfer of the second type of data during this period may be blocked.

Figure 6:
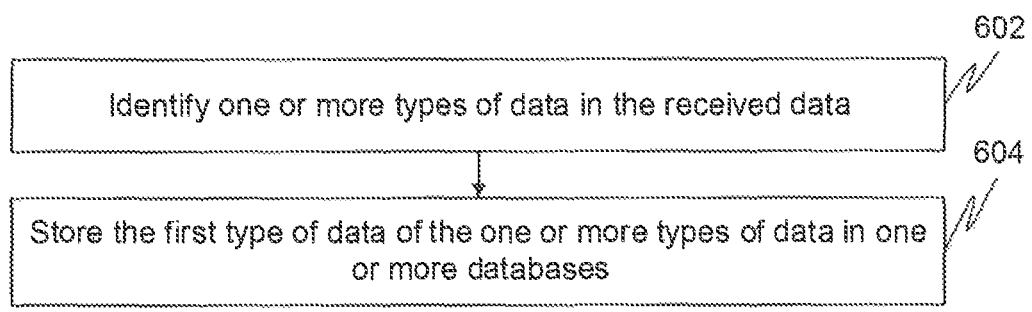
FIG. 6 illustrates a flowchart of a method for storing the first type of data, in accordance with an embodiment.

FIG. 6 illustrates a flowchart of a method for storing the first type of data, in accordance with an embodiment. At step 602, the one or more types of data is identified from the received data that needs to be transferred to the destination. After identifying the one or more types of data, at step 604, the first type of data of the one or more types of data is stored in one or more database accessible through the secondary communication link. In an embodiment, the one or more database may be configured and commissioned depending on state of the transfer of the first type of data over the secondary communication link. Each database of the one or more database is associated with a level in manufacturing process environment 100. This has already been explained in conjunction with FIG. 1. For example, a data-mart may be associated with level 3 or level 4 in manufacturing process environment 100. The data-mart may be configured to capture and store the first type of data coming from level 0 or level 1 of manufacturing process environment 100. The data-mart may be a repository or a specialized database that is configured to store measurement and event data associated with the first type of data.

In an embodiment, the data-mart may reside on a cloud platform or may reside in a data center. Alternatively, in another embodiment, the data-mart may be supported by a data ware house. In the same manner, in yet another embodiment, the data-mart may be part of a Distributed Control System (DCS) or a Supervisory Control and Data Acquisition System (SCADA). It will be evident to a person skilled in the art that the data-mart may be realized through any one or a combination of database technologies existing in the art and the data-mart may reside completely at one level or may reside across multiple levels in IT system 104. Similarly, the data-mart may be situated at one site or may be distributed across several sites. Each data-mart may include information relevant to system that generated or recorded the first type of data. For example, SCADA system may include operational data and non-operational data from all the field devices connected to the SCADA system.

The data-mart also help in reducing the load of the data flow and helps in quickening the transfer of the first type of data to the destination. For example, the transfer of the first type of data can be skipped for certain levels in manufacturing process environment 100. Thus, while transferring the first type of data from level 0 to level 4, the transfer of the first type of data can be skipped for level 1 and level 2 and the first type of data can be directly sent to level 3 or level 4.

The one or more database also enables the transfer of the first type of data over the secondary communication link form a higher level to a lower level in IT system 104. Conventionally, the flow of transfer of the one or more types of data is from the lower level to the higher level in manufacturing environment 100. This has already been explained in conjunction with FIG. 1. Now, as a result of storing the first type of data in the one or more database, the first type of data can be pushed from the higher level to the lower level, unlike the conventional manner of dataflow. For example, if the surface defect data is available at Level 4 in manufacturing process environment 100, then the surface defect data can be pushed from Level 4 to Level 3. The surface defect data may be pushed from Level 4 to Level 3 in order to converge the surface defect data with the production data for facilitating running of analytics application on the surface defect data and the production data at Level 3.

Figure 7:
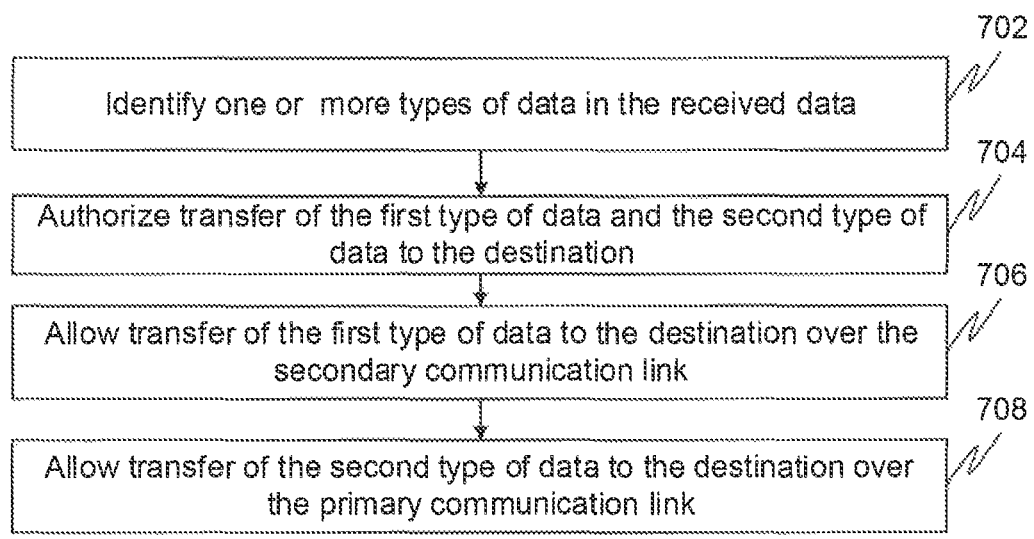
FIG. 7 illustrates a flowchart of a method for authorizing transfer of data, in accordance with an embodiment.

FIG. 7 illustrates a flowchart of a method for authorizing transfer of data, in accordance with an embodiment. At step 702, the one or more types of data is identified in the received data that needs to be transferred from the source to the destination. The one or more types of data may include the first type of data and the second type of data. Before transferring the one or more types of data to the destination, the method performs authorization at step 704. In order to perform the authorization, a user is prompted with details associated with the first type of data and the second type of data. The details may include, but are not limited to volume of the first type of data and the second type of data, severity level of the first type of data and the second type of data, communication characteristics of the primary communication link and the secondary communication link, and details of analytics applications running in IT system 104.

Once the user authorizes the transfer, the method, at step 706, allows for transfer of the first type of data to the destination over the secondary communication link. Thereafter, at step 708, the method allows for transfer of the second type of data to the destination over the primary communication link. In the event that user does not authorize the transfer, the method does not allow for transfer of the first type of data and the second type of data. Thus, the authorization step allows the user to control the transfer of the first type of data and the second type of data. In an embodiment, the authorization step may be performed without any inputs from the user. In another embodiment, the authorization step may be removed and its performance may not be required.

Figure 8:
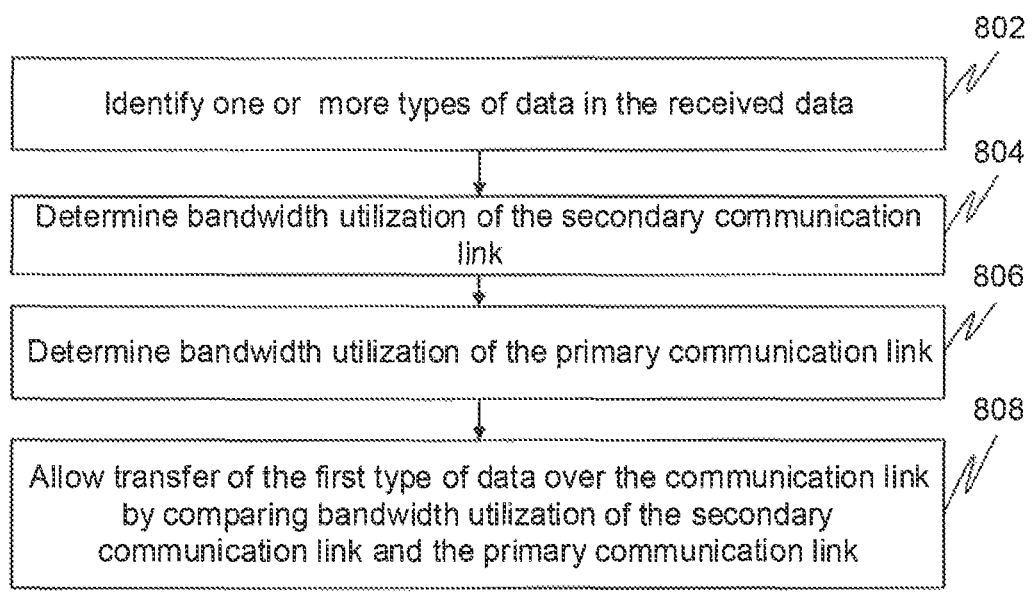
FIG. 8 illustrates a flowchart of a method for determining bandwidth utilization of a primary communication link and bandwidth utilization of a secondary communication link, in accordance with an embodiment.

FIG. 8 illustrates a flowchart of a method for determining bandwidth utilization of a primary communication link and a secondary communication link, in accordance with an embodiment. At step 802, the one or more types of data are identified in the received data that needs to be transferred to the destination. Thereafter, at step 804, the method determines bandwidth utilization of the secondary communication link before initiating the transfer of the first type of data over the secondary communication link. After determining the bandwidth utilization of the secondary communication link, the method determines bandwidth utilization of the primary communication link at step 806. In response to determining the bandwidth utilization of the primary communication link and the secondary communication link, the method compares the bandwidth utilization of the primary communication link and the bandwidth utilization of the secondary communication link to compute a threshold value. The threshold value may be calculated based on the bandwidth utilization of the primary communication link and the secondary communication link. It will be evident to a person skilled in the art that the threshold value may be computed based on a plurality of methods and the method of calculation is not limiting the scope of the present invention. In an embodiment, the threshold value may be dynamically changed depending on conditions present in manufacturing process environment 100.

In the event that the bandwidth utilization of the primary communication link is below the threshold value, the method allows for transfer of the first type of data over the primary communication link at step 808.

Figure 9:
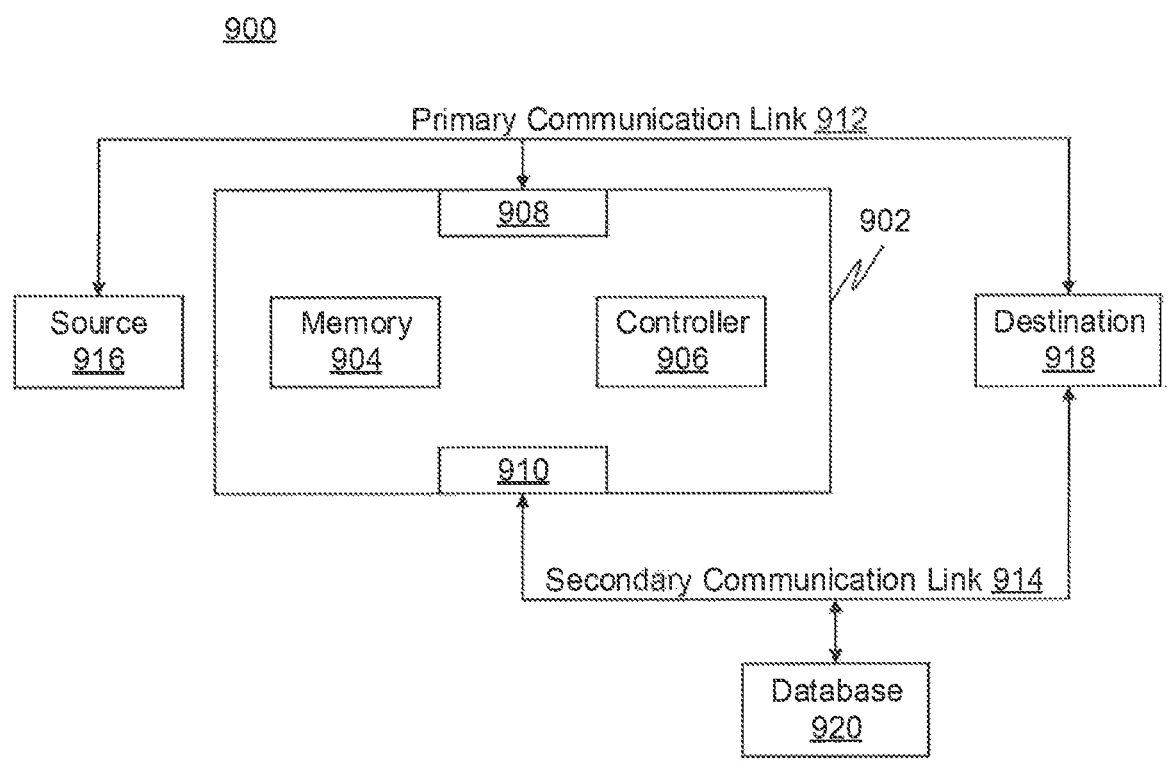
FIG. 9 illustrates a block diagram of a system diagram showing a defect detecting device configured to detect and transfer defect data, in accordance with an embodiment.

FIG. 9 illustrates a block diagram of a system 900 showing a defect detecting device 902 configured to detect and transfer defect data, in accordance with an embodiment. Defect detecting device 902 includes a memory 904, operatively coupled to a controller 906. Defect detecting device 902 further includes a primary communication interface 908 and a secondary communication interface 910. Primary communication interface 908 is configured to receive and transmit data over a primary communication link 912 and secondary communication interface 910 is configured to transmit and receive data over a secondary communication link 914. Typically, secondary communication link 914 is configured to enable faster data transfer rate as compared to primary communication link 912. Specifically, the secondary communication link 914 includes optimized routes for transferring the first type of data from source 916 to destination 918 in a manner that is faster than primary communication link 912. Moreover, secondary communication link 914 is specifically adapted for carrying the first type of data of the one or more types of data. This has already been explained in conjunction with FIG. 2.

Defect detecting device 902 is configured to transfer data from a source 916 to a destination 918 over primary communication link 912 or over secondary communication link 914. Defect detecting device 902 receives data that needs to be transferred from source 916 to destination 918 and may store the data in memory 904. The data is received through primary communication interface 908 which is operatively coupled to memory 904 and controller 906. After receiving the data, controller 906 identifies one or more types of data in the received data. The one or more types of data may include, but are not limited to production data associated with a material, surface defect data associated with the material, machine data associated with the manufacturing process, sensor data associated with the manufacturing process, and diagnostic data associated with the manufacturing process.

In order to identify the one or more types of data, controller 906 is configured to parse the received data. The data is parsed in order to separate a first type of data of the one or more types of data from a second type of data of the one or more types of data. For example, the data associated with steel manufacturing process is parsed to separate the surface defect data from the production data. The data is separated to facilitate processing of the first type of data in a manner that is different from processing of the second type of data. The surface defect data may be identified using generally available defect identification algorithm. Examples of the defect identification algorithm that may be used to parse the received data and identify the one or more types of data has already been explained in conjunction with FIG. 3.

After identifying the one or more types of data, controller 906 allows the transfer of the first type of data to destination 918 over secondary communication link 914 using secondary communication interface 910, which is operatively coupled to controller 906. The first type of data includes surface defect data associated with a material. For example, the first type of data may include surface defect data associated with steel in a steel manufacturing process.

Thereafter, controller 906 allows transfer of the second type of data to destination 918 over primary communication link 912 using primary communication interface 908, which is operatively coupled to controller 906. The second type of data includes the production data associated with the material, machine data associated with the manufacturing process, sensor data associated with the manufacturing process, and diagnostic data associated with the manufacturing process. In an embodiment, the transfer of the first type of data to the destination over the secondary communication link and the transfer of the second type of data to the destination over the primary communication link may occur simultaneously. In another embodiment, the order of such transfer may be determined dynamically. This has already been explained in conjunction with FIG. 2.

In an embodiment, before allowing for transfer of the first type of data, controller 906 may optimize the transfer of the first type of data over secondary communication link 914. In order to optimize, controller 906 may determine an appropriate cycle time for transferring the data. In the same manner, controller 906 may optimize the transfer by modifying one or more of the bandwidth, frequency, amplitude, and duration associated with the transfer of the first type of data over secondary communication link 914 to destination 918.

Alternatively, controller 906 may dynamically vary volume of the transfer of the first type of data over secondary communication link 914 before allowing for the transfer of the first type of data to destination 918. The volume of the first type of data to be transferred may be dynamically varied based on one or more conditions. Examples of the one or more conditions may include, but are not limited to a bandwidth utilization, a communication link strength, and a data throughput associated with the secondary communication link.

In the same manner, controller 906 may prioritize transfer of the first type of data over secondary communication link 914 before allowing for the transfer of the first type of data to destination 918. The transfer of the first type of data to destination 918 may be prioritized based on one or more factors. Examples of the one or more factors may include, but are not limited to a type of analytics application running in IT system 104, size of the data, life of the data, and category of the data associated with the first type of data. It will be evident to a person skilled in the art that any other type of processing may be performed on the first type of data by controller 906 before allowing for the transfer of the first type of data to destination 918 over secondary communication link 914 in order to achieve higher efficiency, quality, and reliability.

In an embodiment, depending on one or more criteria, controller 906 may block the transfer of the second type of data destination 918 over primary communication link 912. The one or more criteria may include a predefined criterion, a user defined criterion, and a real-time criterion. For example, the real-time criterion may include an existing condition associated with the primary communication link. The pre-defined criterion may include a prioritization level associated with the first type of data, and a severity level associated with the first type of data. The user defined criterion may include a type of analytics application running in IT system 104.

Thus, if the prioritization level of the first type of data requires immediate transfer of the first type of data to destination 918, then the first type of data may be allowed to be transferred on primary communication link 912 in addition to secondary communication link 914 and the transfer of the second type of data over primary communication link 912 may be blocked during this period by controller 906. In the same manner, if the analytics application running in IT system 104 requires greater availability of the first type of data, then the first type of data may be transferred on primary communication link 912 in addition to secondary communication link 914 and the transfer of the second type of data during this period may be blocked by controller 906.

In an embodiment, after identifying the one or more types of data, controller 906 may store the first type of data in one or more data-mart accessible through secondary communication link 914. For example, as shown in FIG. 9, a data-mart 920 is illustrated which resides on secondary communication link 914. It will be evident to a person skilled in the art that additional data-marts may be situated on secondary communication link 914 at various levels in IT system 104. The one or more data-marts may be configured and commissioned depending on existing condition of the transfer of the first type of data over secondary communication link 914. This has been already explained in conjunction with FIG. 1.

In an embodiment, data-mart 920 may reside on a cloud platform or may reside in a data center. Alternatively, in another embodiment, data-mart 920 may be supported by a data ware house. In the same manner, in yet another embodiment, data-mart 920 be part of a Distributed Control System (DCS) or a Supervisory Control and Data Acquisition System (SCADA). It will be evident to a person skilled in the art that data-mart 920 may be realized through any one or a combination of database technologies existing in the art and data-mart 920 may reside completely at one level or may reside across multiple levels in IT system 104.

Data-mart 920 will contain information relevant to system that recorded the first type of data of the one or more types of data. For example, SCADA system will contain operational data and non-operational data from all the field devices connected to the SCADA system.

The one or more database enables the transfer of the first type of data over secondary communication link 914 form a higher level to a lower level in IT system 104. Conventionally, the flow of transfer of the one or more types of data is from the lower level to the higher level in IT system 104. As a result of storing the first type of data in the one or more database, the first type of data can be pushed from the higher level to the lower level. For example, if the surface defect data is available at Level 4 in IT system 104, then the surface defect data can be pushed from Level 4 to Level 3. This has already been explained in conjunction with FIG. 6.

In an embodiment, controller 906 may also perform authorization before transferring the one or more types of data to destination 918. To perform the authorization, controller 906 may prompt a user with details corresponding to the first type of data and the second type of data. The details may include, but are not limited to volume of the first type of data and the second type of data, a severity level associated with the first type of data and the second type of data, communication characteristics of primary communication link 912 and secondary communication link 914, and details of analytics applications running at IT system 104.

Once the user authorizes the transfer, controller 906 may allow for transfer of the first type of data to the destination over secondary communication link 914. Thereafter, controller 906 may allow for transfer of the second type of data to destination 918 over primary communication link 912. In the event that user does not authorize the transfer, then controller 906 does not allow for transfer of the first type of data and the second type of data. In an embodiment, the authorization step may be performed directly by controller 906 without any inputs from the user. In another embodiment, the authorization step may be removed and is not required to be performed. In this case, the transfer of the first type of data and the second type of data may be done without requiring any authorization.

In another embodiment, controller 906 may determine bandwidth utilization of secondary communication link 914 before initiating the transfer of the first type of data over secondary communication link 914. After determining the bandwidth utilization of secondary communication link 914, controller may determine bandwidth utilization of primary communication link 912. Thereafter, controller 906 compares the bandwidth utilization of primary communication link 912 and the bandwidth utilization of secondary communication link 914.

In the event that the bandwidth utilization of primary communication link 912 is below a threshold value, then controller 906 allows for transfer of the first type of data over primary communication link 912. The threshold value is calculated by controller 906 based on the bandwidth utilization of primary communication link 912 and secondary communication link 914. It will be evident to a person skilled in the art that the threshold value may be computed based on a plurality of methods and the method of calculation is not limiting the scope of the present invention. In an embodiment, the threshold value may be dynamically changed depending on conditions present in manufacturing process environment 100.

Figure 10:
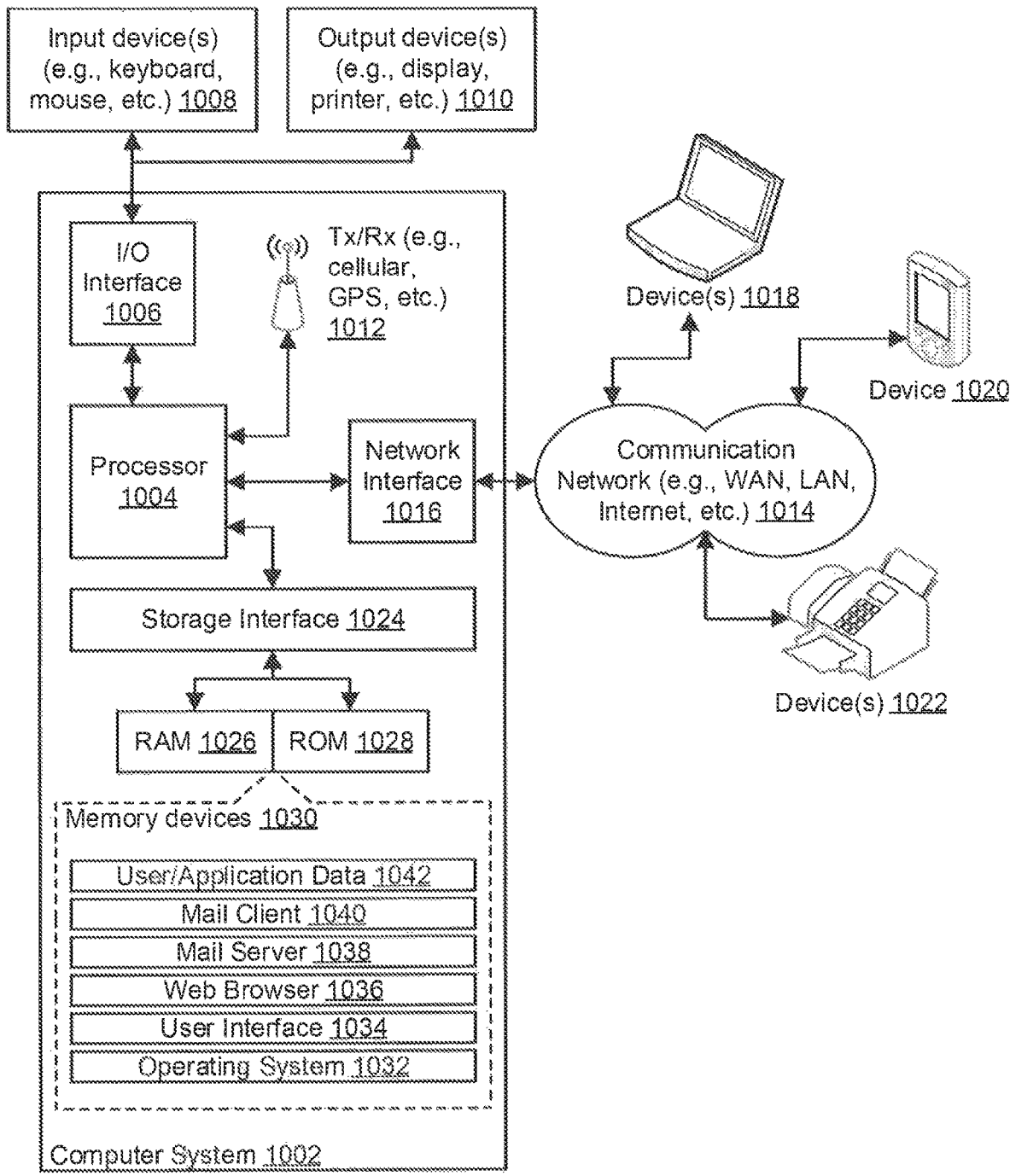
FIG. 10 illustrates a block diagram of an exemplary computer system for implementing various embodiments.

FIG. 10 illustrates a block diagram of an exemplary computer system 1002 for implementing various embodiments is disclosed. Computer system 1002 may comprise a central processing unit ("CPU" or "processor") 1004. Processor 1004 may comprise at least one data processor for executing program components for executing user- or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD Athlon, Duron or Opteron, ARM's application, embedded or secure processors, IBM PowerPC, Intel's Core, Itanium, Xeon, Celeron or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., Texas Instruments WiLink WL1283, Broadcom BCM4760IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 602 may itself embody one or more of these devices.

In some embodiments, processor 1004 may be disposed in communication with one or more memory devices (e.g., a RAM 1026, a ROM 1028, etc.) via a storage interface 1024. Storage interface 1024 may connect to memory devices 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1030 may store a collection of program or database components, including, without limitation, an operating system 1032, a user interface application 1034, a web browser 1036, a mail server 1038, a mail client 1040, a user/application data 1042 (e.g., any data variables or data records discussed in this disclosure), etc. Operating system 1032 may facilitate resource management and operation of computer system 1002. Examples of operating system 1032 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1002 may implement web browser 1036 stored program component. Web browser 1036 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1002 may implement mail server 1038 stored program component. Mail server 1038 may be an Internet mail server such as Microsoft Exchange, or the like. Mail server 1038 may utilize facilities such as ASP, ActiveX, ANSI C++/C #, Microsoft .NET, CGI scripts, Java, JavaScript, PERL, PHP, Python, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement mail client 1040 stored program component. Mail client 1040 may be a mail viewing application, such as Apple Mail, Microsoft Entourage, Microsoft Outlook, Mozilla Thunderbird, etc.

In some embodiments, computer system 1002 may store user/application data 1042, such as the data, variables, records, etc. as described in this disclosure. Such databases may be implemented as fault-tolerant, relational, scalable, secure databases such as Oracle or Sybase.

Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide methods, system, and computer program products for detecting and transferring defect data in a manufacturing process environment. The method lowers the overhead of terminal computer system, data acquisition devices, and defect detection devices and allows for faster and simpler transfer of defect information in the manufacturing process environment. The method also ensures that non-defect data that is not required for analysis are blocked from transmission thereby leading to faster analysis and identification of root cause analysis. Moreover, the method supports backward convergence by allowing data to transfer from higher levels to lower levels in the manufacturing process environment. As a result of effective data management achieved using the method, there is also an improved performance achieved for supply chain production IT applications.

The specification has described systems and methods for detecting and transferring defect data in a manufacturing process environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transferring defect, information during a manufacturing process, the method comprising:
    receiving, by a defect detecting device, data to be transferred from a source to a destination over a primary communication link, wherein the primary communication link connects the source to the destination;
    parsing, by the defect detecting device, the received data to separate the received data into a first type of data and a second type of data, based on an image sensing algorithm, wherein the first type of data corresponds to the defect information;
    allowing, by the defect detecting device, transfer of the first type of data to the destination over a secondary communication link, wherein the secondary communication link has faster data transfer rate than the primary communication link, and wherein the secondary communication link connects the source to the destination;
    prioritizing, by the defect detecting device, transfer of the first type of data over the secondary communication link based on one or more factors, before allowing the transfer of the first type of data to the destination, wherein the one or more factors comprise severity level associated with the first type of data and category associated with the first type of data; and
    allowing, by the defect detecting device, transfer of the second type of data to the destination over the primary communication link.

2. The method of claim 1, wherein the step of allowing transfer of the first type of data further comprises at least one of optimizing the transfer of the first type of data over the secondary communication link, dynamically varying the volume of the transfer of the first type of data over the secondary communication link.

3. The method of claim 1, wherein the primary communication link is associated with a first communication interface, wherein the secondary communication link is associated with a second communication interface, and wherein the primary communication link is different from the secondary communication link.

4. The method of claim 1, further comprising,
    blocking transfer of the second type of data to the destination over the primary communication link based on fulfillment of at least one criterion,
    wherein the at least one criterion comprises a predefined criterion, a user defined criterion, and a real-time criterion, and
    wherein the predefined criterion, comprises a prioritization level associated with the first type of data and the severity level associated with the first type of data; the user defined criterion comprises a type of analytics application running in an Information Technology (IT) system associated with a manufacturing environment; and the real-time criterion comprises an existing condition associated with the primary communication link.

5. The method of claim 1, further comprising storing the first type of data on the secondary communication link in at least one database before transferring the first type of data to the destination, wherein the at least one database comprises at least one of a data-mart, a data-ware, a data center, and a cloud based storage.

6. The method of claim 1, further comprising authorizing the step of allowing the transfer of the first type of data to the destination over the secondary communication link and authorizing the step of allowing the transfer of the second type of data to the destination over the primary communication link.

7. The method of claim 1, further comprising determining a bandwidth utilization of the primary communication link, and a bandwidth utilization of the secondary communication link.

8. The method of claim 7, further comprising transferring the first type of data over the primary communication link when the bandwidth utilization of the primary communication link and the bandwidth utilization of the secondary communication link meet a threshold.

9. The method of claim 1, wherein the first type of data further comprises surface defect data, alarm data, and alert data, and wherein the second type of data comprises manufacturing data, production data, and operational data.

10. A defect detecting device configured to transmit defect information during a manufacturing process, the defect detecting device comprising:
a memory; and
a controller operatively coupled to the memory, wherein the controller is configured to:
receive data to be transferred from a source to a destination over a primary communication link, wherein the primary communication link connects the source to the destination;
parse the received data to separate the received data into a first type of data and a second type of data, based on an image sensing algorithm, wherein the first type of data corresponds to the defect information;
allow transfer of the first type of data to the destination over a secondary communication link, wherein the secondary communication link has faster data transfer rate than the primary communication link, and wherein the secondary communication link connects the source to the destination;
prioritize transfer of the first type of data over the secondary communication link based on one or more factors, before allowing the transfer of the first type of data to the destination, wherein the one or more factors comprise severity level associated with the first type of data and category associated with the first type of data; and
allow transfer of the second type of data to the destination over the primary communication link.

11. The defect detecting device of claim 10, wherein the controller is further configured to optimize the transfer of the first type of data over the secondary communication link, dynamically vary the volume of the transfer of the first type of data over the secondary communication link.

12. The defect detecting device of claim 10, further comprising a first communication interface associated with the primary communication link, a second communication interface associated with the secondary communication link, and wherein the primary communication link is different from the secondary communication link.

13. The defect detecting device of claim 10, wherein the controller is further configured to:
block transfer of the second type of data to the destination over the primary communication link based on fulfillment of at least one criterion,
wherein the at least one criterion comprises a predefined criterion, a user defined criterion, and a real-time criterion, and
wherein the predefined criterion comprises a prioritization level associated with the first type of data and the severity level associated with the first type of data; the user defined criterion comprises a type of analytics application running in an Information Technology (IT) system associated with a manufacturing environment; and the real-time criterion comprises an existing condition associated with the primary communication link.

14. The defect detecting device of claim 10, wherein the controller is further configured to store the first type of data on the secondary communication link in at least one database before transferring the first type of data to the destination, wherein the at least one database comprises at least one of a data-mart, a data-ware, a data center, and a cloud based storage.

15. The defect detecting device of claim 10, wherein the controller is further configured to authorize:
the transfer of the first type of data to the destination over the secondary communication link; and
the transfer of the second type of data to the destination over the primary communication link.

16. The defect detecting device of claim 10, wherein the controller is further configured to determine a bandwidth utilization of the primary communication link, and a bandwidth utilization of the secondary communication link.

17. The defect detecting device claim 16, wherein the controller is further configured to transfer the first type of data over the primary communication link when the bandwidth utilization of the primary communication link and the bandwidth utilization of the secondary communication link meet a threshold.

18. A non-transitory computer-readable storage medium stored thereon, a set of computer-executable instructions causing a computer comprising one or more processors to perform steps comprising:
receiving data to be transferred from a source to a destination over a primary communication link, wherein the primary communication link connects the source to the destination;
parsing the received data to separate the received data into a first type of data and a second type of data, based on an image sensing algorithm, wherein the first type of data corresponds to the defect information;
allowing transfer of the first type of data to the destination over a secondary communication link, wherein the secondary communication link has faster data transfer rate than the primary communication link, and wherein the secondary communication link connects the source to the destination;
prioritizing transfer of the first type of data over the secondary communication link based on one or more factors, before allowing the transfer of the first type of data to the destination, wherein the one or more factors comprise severity level associated with the first type of data and category associated with the first type of data; and
allowing transfer of the second type of data to the destination over the primary communication link.

* * * * *